US010349314B2

(12) United States Patent
Tseng et al.

(10) Patent No.: US 10,349,314 B2
(45) Date of Patent: Jul. 9, 2019

(54) SYSTEM AND METHOD FOR SERVICE CONTINUITY IN HETEROGENEOUS WIRELESS NETWORKS

(71) Applicant: NATIONAL CHIAO TUNG UNIVERSITY, Hsinchu (TW)

(72) Inventors: Chien-Chao Tseng, Hsinchu (TW); Min-Cheng Chan, Taichung (TW)

(73) Assignee: National Chiao Tung University, Hsinchu (TW)

( * ) Notice: Subject to any disclaimer, the term of this patent is extended or adjusted under 35 U.S.C. 154(b) by 135 days.

(21) Appl. No.: 15/275,689

(22) Filed: Sep. 26, 2016

(65) Prior Publication Data
US 2017/0013514 A1    Jan. 12, 2017

Related U.S. Application Data

(63) Continuation-in-part of application No. 14/242,208, filed on Apr. 1, 2014.

(30) Foreign Application Priority Data

Jun. 11, 2013 (TW) .............................. 102120784 A

(51) Int. Cl.
*H04W 36/00* (2009.01)
*H04L 29/12* (2006.01)
*H04L 29/08* (2006.01)

(52) U.S. Cl.
CPC ..... *H04W 36/0022* (2013.01); *H04L 61/2007* (2013.01); *H04L 67/142* (2013.01); *H04W 36/0016* (2013.01)

(58) Field of Classification Search
None
See application file for complete search history.

(56) References Cited

U.S. PATENT DOCUMENTS

8,166,192 B2   4/2012 Suh et al.
8,190,191 B2   5/2012 Livet et al.
(Continued)

OTHER PUBLICATIONS

Janardhan R. Iyengar, Paul D. Amer, Randall Stewart; Concurrent Multipath Transfer Using SCTP Multihoming over Independent End-to-End Paths; IEEE/ACM Transactions on Networking, vol. 14, No. 5, Oct. 2006, pp. 951-964.
(Continued)

*Primary Examiner* — Chi H Pham
*Assistant Examiner* — Rual Rivas
(74) *Attorney, Agent, or Firm* — Rosenberg, Klein & Lee

(57) ABSTRACT

The present invention provides a system and a method for service continuity in heterogeneous wireless networks, which comprises a handover decision module and a session continuity module. The handover decision module is responsible for maintaining link layer association and network layer reachability in according to the underlying network conditions to fulfill the service requirement of applications. When acting as a sender, the session continuity module will select transmission path(s), reestablish the transport connection(s) and tag packets with session IDs and sequence numbers. When acting as a receiver, the session continuity module will identify and reorder packets using session IDs and sequence numbers, regardless of the IP addresses and ports of the packets. To sum up, the present invention can provide service continuity and multipath transmission for network devices.

8 Claims, 2 Drawing Sheets

(56) References Cited

U.S. PATENT DOCUMENTS

| | | | |
|---|---|---|---|
| 8,250,619 B2 | 8/2012 | Song et al. | |
| 8,310,976 B2 | 11/2012 | Lee et al. | |
| 8,347,343 B2 | 1/2013 | Suh et al. | |
| 8,407,743 B2 | 3/2013 | Suh et al. | |
| 2009/0113539 A1 | 4/2009 | Shu et al. | |
| 2013/0053034 A1 | 2/2013 | Lee et al. | |
| 2013/0166766 A1* | 6/2013 | Nahrstedt | H04L 29/06027 709/231 |

OTHER PUBLICATIONS

Omneya Issa, Jean-Charles Gregoire, Yacine Belala; An Embedded Platform for Reliable Applications over Heterogeneous Wireless Networks; Symposium on World of Wireless, Mobile and Multimedia Networks, pp. 1-6, Jun. 2008.

Alan Ford, Costin Raiciu, Mark Handley and Olivier Bonaventure; TCP Extensions for Multipath Operation with Multiple Addresses, IETF Multipath TCP Working Group, 2012.

Min-Cheng Chan, Chien-Chao Tseng, Li-Hsing Yen; A Cross-Layer Architecture for Service Continuity and Multipath Transmission in Heterogeneous Wireless Networks, IEEE Wireless Communications and Networking Conference, Apr. 10, 2013.

Tariq Elkourdi, Amith Chincholi, Tan Le, Alpaslan Demir; Cross-Layer Optimization for Opportunistic Multi-MAC Aggregation; Vehicular Technology Conference (VTC Spring), 2013 IEEE 77th, Jun. 2-5, 2013, pp. 1-5.

\* cited by examiner

SYSTEM AND METHOD FOR SERVICE CONTINUITY IN HETEROGENEOUS WIRELESS NETWORKS

REFERENCE TO RELATED APPLICATION

This Application is being filed as a Continuation-in-Part of application Ser. No. 14/242,208, filed 1 Apr. 2014, currently pending, the entire contents of which are hereby incorporated by reference.

BACKGROUND OF THE INVENTION

Field of the Invention

The present invention relates to a network service continuity technology, and more particularly to a system and a method for service continuity in heterogeneous wireless networks.

Description of the Prior Art

Generally speaking, most of the applications in network devices cannot handle the changes in network connectivity during the handover procedure. For example, when a network device moves to a new location and changes its point of network attachment, network connections on the devices may be terminated or suspended, and the user may need to resume network services manually. This disconnection and manual reconnection may degrade the service qualities, thus resulting in bad user experience.

Moreover, network devices nowadays usually can utilize different types of networks (e.g., 3G and Wi-Fi) and transmit data through a plurality of paths in heterogeneous networks, wherein a path is a connection of an Internet IP address on the network device to another Internet IP address on a corresponding device. For example, if the data was initially transmitted through a Wi-Fi network and the Wi-Fi network signal has gone weak, then the data could instead be transmitted through a 3G network. For another example, data can be transmitted through the 3G network along with the Wi-Fi network concurrently to increase the efficiency of data transmission.

However, switching wireless interfaces may disrupt or, even the worse, terminate the data transmission of the ongoing communication sessions of network devices. Furthermore, concurrent data transmission through a plurality of paths may introduce out-of-order data reception in the receiver end due to the diversity of bandwidths, delays and reliabilities in heterogeneous wireless networks. Such out-of-order data reception may seriously degrade the efficiencies of data transmission with multiple wireless networks.

Take the US patent application No. 2009/0113539 for example. The patent disclosed a gateway system for implementing access to various media, wherein the gateway system includes a handover decision module. Accordingly, the communication media access module of the gateway system enables, through cooperation with the media independent handover function (MIHF) module and the handover decision module, the user equipment (UE) in the local area network (LAN) environment to accomplish media independent seamless handover, so that uninterrupted access to the service network subsystem domain is achieved. However, in the architecture, all the application programs of the devices in the LAN have to use connections with the same quality. Even if the devices or the programs have requests for different quality of service (QoS), they are still forced to use connection with the same quality. Moreover, the architecture of the patent cannot support the delivery of cross-layer events. As a result, the application programs cannot acquire the information of the link layer, so as not to optimize the behavior of the application programs according to the information of the link layer.

On account of above, the present invention proposes, for the professionals in the field, a system and a method for devices to utilize multiple heterogeneous wireless interfaces effectively in accordance with the application requirements and the network conditions.

SUMMARY OF THE INVENTION

In order to use heterogeneous wireless network effectively, the overall objective of the present invention is to provide a system together with a method to support service continuity and concurrent multipath transmission efficiently for network devices in heterogeneous wireless networks.

The present invention adopts a cross-layer design with four sub-objectives. The first sub-objective is to provide an application programming interface (API) for the users to develop a mobility-aware application easily.

The second sub-objective is to maintain the link layer association and network layer reachability with an appropriate base station that can provide better data delivery services.

The third sub-objective is to maintain the ongoing sessions using any appropriate interfaces when some underlying interfaces encounter a transient disconnection due to poor network condition or during handover procedures. It should be noted that each interface may have its own IP addresses. Therefore, to achieve this sub-objective, the present invention must be able to identify and resume ongoing sessions even if the network addresses of the network device or a corresponding device have changed.

The last sub-objective is to offer network devices concurrent, in-order and reliable multipath transmission to enhance transmission efficiency. As a sender, a network device can transmit application data over a plurality of transmission paths. As a receiver, the network device can merge and reorder those data received from different transmission paths and then delivers them to the corresponding application.

In order to achieve the above-mentioned objectives, the system of the present invention comprises a cross-layer cooperative module to cooperate the functionalities provided by three other components, an application programming interface (API), a handover decision module and a session continuity module. The API provides an interface for applications of a network device to access functionalities provided by the present invention. The handover decision module is responsible for determining when and how to switch the association of a particular interface from the current base station to a better base station so that the new association can provide better network layer reachability to fulfil the service requirements of applications. The session continuity module provides service continuity and concurrent multipath transmission for applications, by determining which interfaces to use to establish at least one transmission path with a corresponding device.

In another aspect, the present invention further provides a method for service continuity in heterogeneous wireless networks. The service continuity method of the present invention comprises three operations. First, the handover decision module of a network device reselects a new base station and resumes the network layer reachability (acquire new IP address if inter-subnet handover is performed), possibly in advance so as to shorten handover latency, when the current network condition cannot satisfy the service requirements of applications. Second, the session continuity module sends out data packets, on behalf of the applications, from at least one available transmission path, according to the network conditions and the service requirements of applications. Third, the session continuity module merges and reorders packets it receives from a corresponding device, on behalf of the applications, through at least one transmission paths, either due to concurrently multipath transmission, interface switching or handovers.

These and other objectives of the present invention will become obvious to those of ordinary skill in the art after reading the following detailed description of preferred embodiments.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
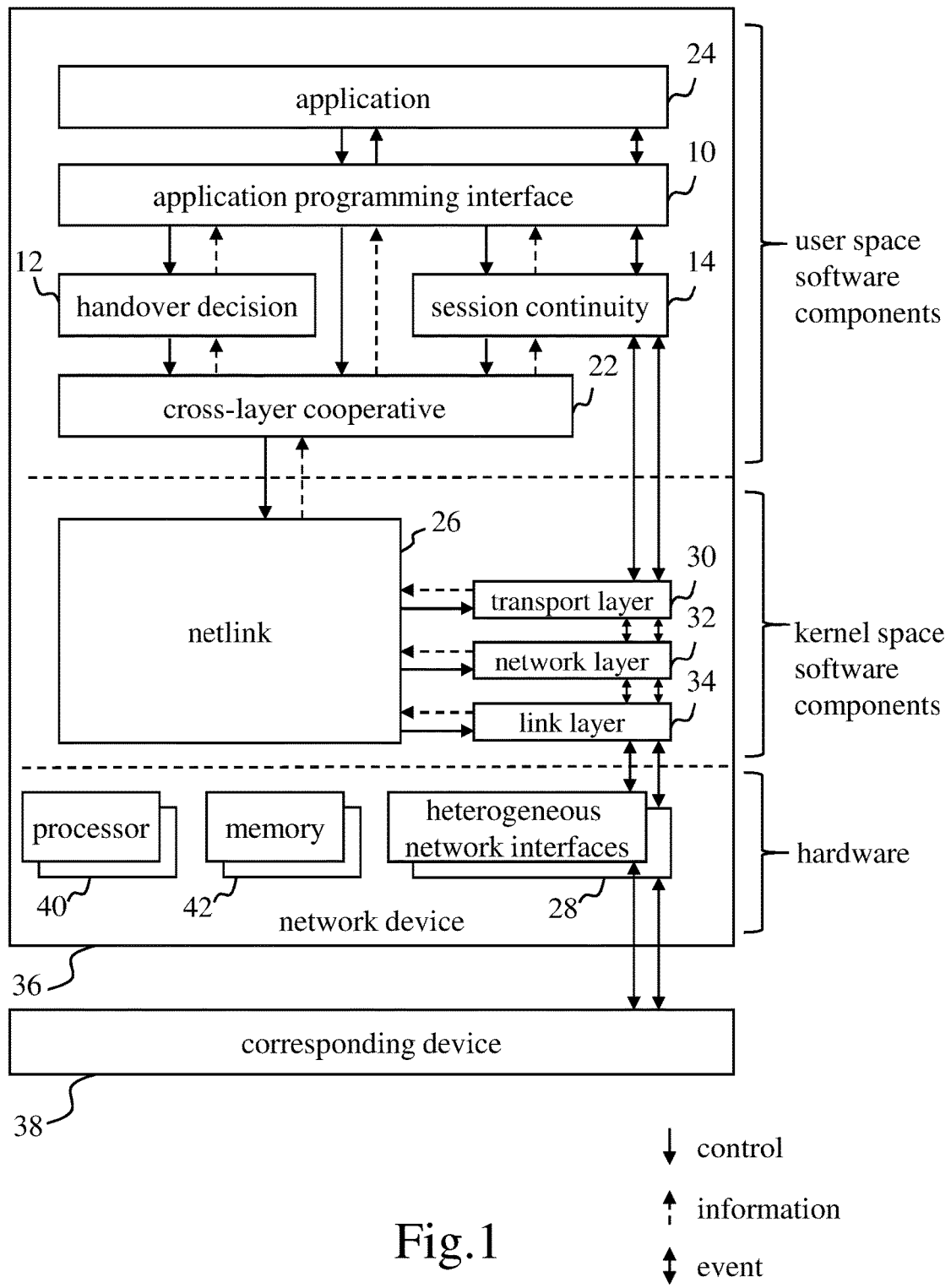
FIG. 1 shows a block diagram of the system for service continuity in heterogeneous wireless networks in accordance with one embodiment of the present invention.

Reference will now be made in detail to the preferred embodiments of the present invention, examples of which are illustrated in the accompanying drawings. Wherever possible, the same reference numbers are used in the drawings and the description to refer to the same or like parts.

The embodiments described below are illustrated to demonstrate the technical contents and characteristics of the present invention and to enable the persons skilled in the art to understand, make, and use the present invention. However, it shall be noticed that, it is not intended to limit the scope of the present invention. Therefore, any equivalent modification or variation according to the spirit of the present invention is to be also included within the scope of the present invention.

The present invention discloses a system and a method for service continuity in heterogeneous wireless networks. Please refer to FIG. 1, which shows a block diagram of the system for service continuity in heterogeneous wireless networks in accordance with one embodiment of the present invention. As shown in FIG. 1, the network device 36 comprises plural user space software components, plural kernel space software components and plural hardware components, wherein the user space software components comprises an application programming interface (API) 10, a handover decision module 12, a session continuity module 14, a cross-layer cooperative module 22 and at least an application 24, and the modules and the application programs are all software components wherein the application programming interface 10 interconnects with the application 24 of the network device such that the application 24 of the network device can operate at least one function provided by the present invention through the application programming interface 10. For example, the at least one function includes but is not limited to registering network-related events or setting service requirements through the application programming interface 10. According to the embodiment of the present invention, when the current network condition (e.g. the strength of network signal changes) cannot satisfy the service requirement of applications 24, then the handover decision module 12 reselects a better base station and gets prepared for a handover so as to reduce the time needed for the handover. The handover decision module 12 will resume network layer reachability (and acquire a new IP address if inter-subnet handover is performed) after a new base station is reconnected. When the network device 36 is acting as a sender, the session continuity module 14 of a network device 36 sends out data packets to a corresponding device 38 from at least one transmission path; and when the network device 36 is acting as a receiver, the session continuity module 14 of the network device 36, merges and reorders the packets it receives from the corresponding device 38 via the previous base station and the new base station after handover, or via a plurality of transmission paths if current multipath transmission is in use. The network device can be but is not limited to a user device, such as personal computer, laptop, smart phone or tablet.

Furthermore, as shown in FIG. 1, the network device 36 additionally comprises a cross-layer cooperative module 22, which interacts with the application programming interface 10, the handover decision module 12, and the session continuity module 14. When the application programming interface 10, the handover decision module 12 or the session continuity module 14 asks for command services or information services, the cross-layer cooperative module 22 performs the command or acquires the information on behalf of those modules. Furthermore, the application programming interface 10, the handover decision module 12, or the session continuity module 14 may register events of interest with the cross-layer cooperative module 22. When at least one registered event is triggered, the cross-layer cooperative module 22 informs the application programming interface 10, the handover decision module 12, or the session continuity module 14, whichever has registered the corresponding events, to handle the events. For example, the handover decision module 12 can register an event of signal strength change with the cross-layer cooperative module 22 through the event service. When the signal strength changes, the cross-layer cooperative module 22 notifies the handover decision module 12 of the signal strength change event.

According to one embodiment of the present invention, the application programming interface 10, the handover decision module 12, the session continuity module 14 and the cross-layer cooperative module 22 are user space software components of a network device 36. Since the cross-layer cooperative module 22 is further connected to a transport layer 30, a network layer 32 and a link layer 34, which are kernel space software components of the network device 36 through the netlink 26, the cross-layer cooperative module 22 can send instructions to the kernel space software components and acquire information and events thereof.

In one embodiment of the present invention, the netlink 26 is a Linux built-in method for the communication between the kernel space software components and user space software components. Furthermore, the heterogeneous network interfaces 28 may consist of different wireless networks such as Wi-Fi, WiMax, 3G or LTE.

Hardware of the network device 36 comprises at least one processor 40, at least one storing device 42 and at least two network interface cards. The processor 40 performs various functions of the network device 36. The storing device 42 stores data of the handover decision module 12, the session continuity module 14 and the cross-layer cooperative module 22. Each network interface card is used as a heterogeneous network interface 28 to transmit and receive the data between two network devices 36. Moreover, according to the embodiment of the present invention, the cross-layer cooperative module 22 is responsible for interacting with the link layer 34, the network layer 32 and the transport layer 30 in TCP/IP kernel, through the netlink 26, to carry out commands issued by the handover decision module 12, by the session continuity module 14 or directly by the applications 24 through the application programming interface 10. According to the embodiment of the present invention, the cross-layer cooperative module 22 can execute link layer related operations on behalf of the applications, the handover decision module 12 or by the session continuity module 14. For example, the handover decision module 12 may instruct the cross-layer cooperative module 22 to perform a full channel scan to refresh neighbor base station information or to associate with a specific base station. For another example, when the link layer changes its association with another base station, the cross-layer cooperative module 22 may report a link down when the old association breaks down and a link up after the new association has been made. The handover decision module 12 may use these two events as an indication to trigger dynamic host configuration protocol (DHCP) procedure to acquire a new IP address. After the network layer 32 acquire a new IP the cross-layer cooperative module 22 may informs session continuity module 14 or applications 24 an IP-change event. The session continuity module 14 may in turn instruct the cross-layer cooperative module 22 to re-establish transport-layer connections after both link- and network-layer handovers complete.

As shown in FIG. 1, command services are transmitted from the handover decision module 12, from the session continuity module 14 or from applications 24 to the cross-layer cooperative module 22. Whereas the information and event services are transmitted from the cross-layer cooperative module 22 to the handover decision module 12, to the session continuity module 14 or to the applications 24 through the application programming interface 10. Data, on the other hand, will be transmitted bi-directionally between the applications 24 and the session continuity module 14, through the application programming interface 10, or between the session continuity module 14 and the transport layer 30.

Figure 2:
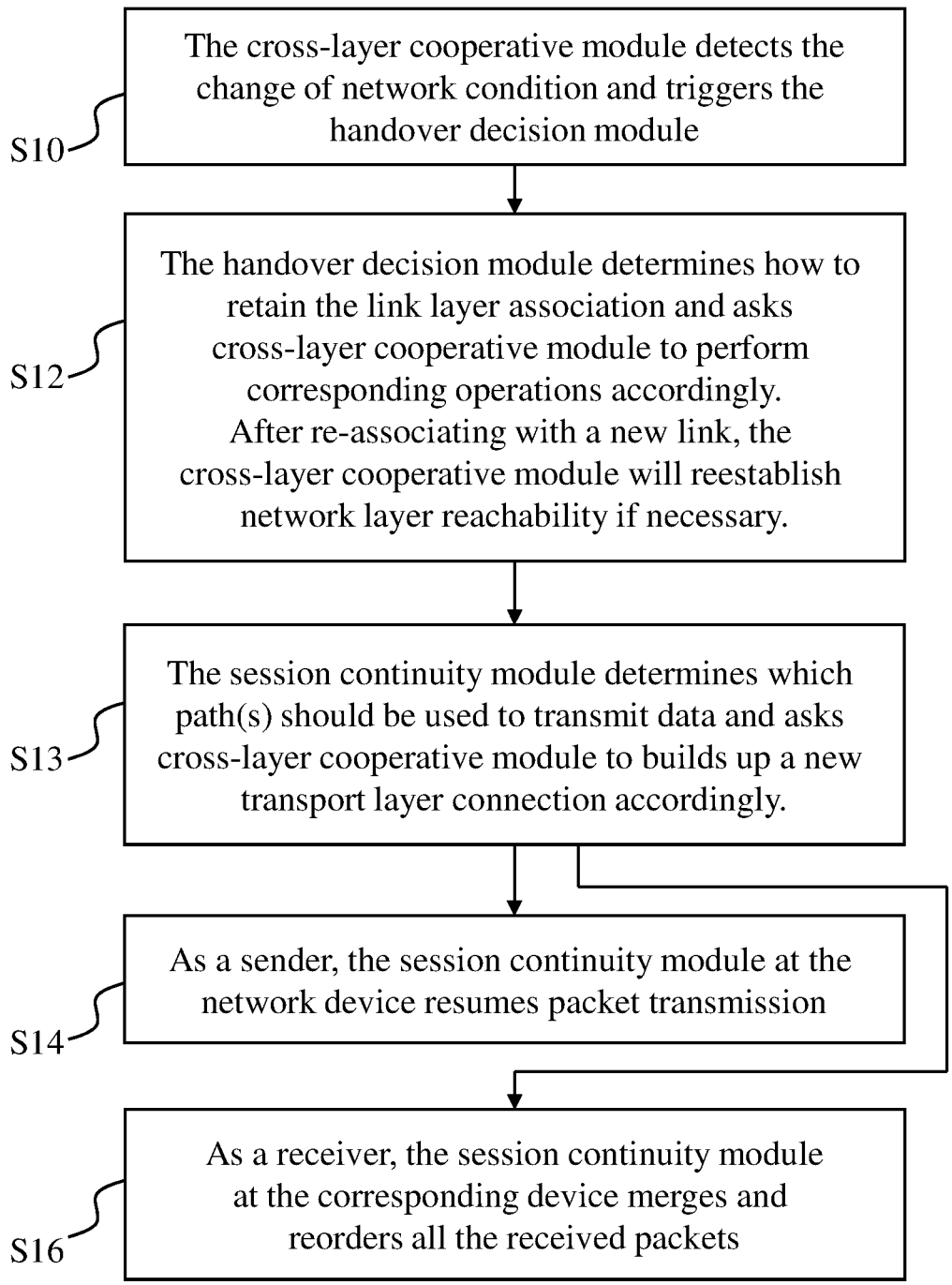
FIG. 2 shows the operations performed by the service continuity method in heterogeneous wireless networks in accordance with one embodiment of the present invention.

Please refer to FIG. 2 for a transmission method for service continuity in heterogeneous wireless networks, wherein FIG. 2 shows the operations in the method for service continuity in heterogeneous wireless networks in accordance with one embodiment of the present invention. The link layer of network device 34 continuously provides link condition events (such as signal strength change) to the cross-layer cooperative module 22. When the current network condition cannot satisfy the service requirement of applications 24 (e.g. the network device has gone far away from the original base station such that the strength of network signal has become weak), the cross-layer cooperative module 22 triggers the handover decision module 12 in step S10. In step S12, the handover decision module 12 determines how to maintain the link layer association and asks cross-layer cooperative module to perform corresponding operations accordingly. After re-associating with a new link, the cross-layer cooperative module will inform the handover decision module 12 of link re-association event (link up). After receiving the event, the handover decision module 12 may need to acquire a new network address (IP address) to maintain the network layer reachability if the link re-association is accompanied with a network change. In this case, the cross-layer cooperated module 22 will send the network change event to the session continuity module 14. Consequently, in S13, the session continuity module 14 determines which path(s) should be used to transport data and asks cross-layer cooperative module 22 to builds up a new transport layer connection with the new network address if desired. Any well-known handover method can be applied here in handover decision module 12 to maintain the link layer association and resume the network layer reachability. Thereby, the network device will thus use the new network for data communication. Later in step S14, session continuity module 14 at the sender side can resume packet transmission, and in step S16, the session continuity module 14 at the receiver side can merge and reorder all received packets. According to the embodiment of the present invention, the received packets includes the packets received both with the old IP address through the old base station and with the new IP address through the new base station. Furthermore, according to another embodiment of the present invention, the received packets may include the packets that arrive at the receiver side via a plurality of transmission paths.

According to the embodiment of the present invention, the session continuity module 14 offers a session ID when a session is initialized between a network device and its corresponding device. At the sender side, all packets examined by the session continuity module 14 are encapsulated with a session header containing a session ID and a session sequence number. The session ID is used to uniquely identify a session. Therefore, according to the session ID, when the IP address is changed, the session continuity module 14 at the receiver side can determine if the receiving packets before and after the IP address change belong to the same session. Furthermore, at the receiver side, data of the same session are ordered by their session sequence numbers and then delivered to applications. For example, assume that before sending out the packets, the session continuity module 14 encapsulates the packets in a session head with a sequence of numbers 1, 2, 3, 4 and so on. Further assume that the session continuity module 14 transmits these packets with two transmission paths. According to one embodiment of the present invention, the packets can be transmitted alternatively through the two transmission paths, that is, packets with an odd sequence number (1, 3, and so on) transmitted through the transmission path A and packets with an even sequence number (2, 4, and so on) transmitted through the transmission path B. Therefore, when the session continuity module 14 at the receiver side receives these packets, it merges and reorders the packets according to their sequence numbers. As a result, the session continuity module 14 of the present invention handles transient disconnections and maintains ongoing sessions when IP addresses or data transmission paths are changed. Even under embodiments that a plurality of transmission paths are provided, the present invention still can maintain the continuity of the session and offer a concurrent multipath transmission environment. On account of these benefits, the user can communicate with others without worrying the disconnection caused by handover, or packets ordering due to the changes in transmission paths or concurrent transmissions in multipath transmissions.

As a result, to sum up, a novel system for service continuity in heterogeneous wireless networks and a session continuity method thereof have been provided in the present invention. The present invention utilizes cross-layer cooperative module 22, a handover decision module 12, and a session continuity module 14 to maintain the service continuity of applications in heterogeneous wireless networks. Meanwhile, if a plurality of available transmission paths exists in the system, the present invention can transmit the data through a plurality of transmission paths so as to increase the data transmission efficiency of the system.

Compared with the US patent application No. 2009/0113539, the handover decision module of the present invention is implemented in the network device 36. The network device 36 is a user device with network functions. However, in the US patent, the handover decision module is implemented in the gateway system. Thus, the present invention is quite different from the US patent. The present invention can also achieve uninterrupted access during the handover procedure, and possess the function of delivery of cross-layer events. When the application programming interface 10, the handover decision module 12 or the session continuity module 14 asks for command services or information services, the cross-layer cooperative module 22 performs the command or acquires the information on behalf of those modules. When a plurality of event services occurs, the present invention triggers the application programming interface 10, the handover decision module 12 or the session continuity module 14 to handle the services, and the present invention uses the information acquired to optimize the application programs. Besides, the present invention can also solve the problem of the application programs of all the device of the US patent using connection with the same quality. Since the ordering way of the present invention not only establishes uninterrupted and continuous sessions, but also performs concurrent transmissions in multipath transmissions. The different application programs 24 of the network device 36 respectively choose the best transmission path.

Moreover, by employing the encapsulated packets with a session header containing a session ID and a session sequence number, the packets sent before and after handover can be easily determined whether they belong to the same session. In addition, for those packets received from different transmission paths the session continuity method can determine if they belong to the same session too. Furthermore, with sequence numbers, the session continuity module 14 can merge and reorder these packets to maintain session continuity smoothly.

It will be apparent to those skilled in the art that various modifications and variations can be made to the present invention without departing from the scope or spirit of the invention. In view of the foregoing, it is intended that the present invention cover modifications and variations of this invention provided they fall within the scope of the invention and its equivalent.

What is claimed is:

1. A system for service continuity in heterogeneous wireless networks having at least two network devices, each of said network devices having at least one processor which performs functionalities of said system, said system comprising:
   a handover decision user space processing component executing to maintain link layer association and network layer reachability of each of a plurality of underlying network interfaces;
   a session continuity user space processing component executing to provide a session ID when a session is initialized and a session sequence number per packet in the same session, the session continuity user space processing component executing to provide service continuity and concurrent multipath transmission for a plurality of applications, by determining which of said underlying network interfaces to use in establishing at least one transmission path with a corresponding device,
   wherein when a network device acts as a sender, the session continuity user space processing component sends out data packets to said corresponding device through at least one transmission path, and
   wherein when said network device acts as a receiver, the session continuity user space processing component merges and reorders said data packets received from said corresponding device, regardless of IP addresses and ports of said data packets; and
   a cross-layer cooperative user space processing component interacting with, and performing command and information services for, said handover decision and session continuity user space processing components,
   wherein said cross-layer cooperative user space processing component is executable to interact with a kernel space processing component executing at a transport layer responsive to said handover decision and session continuity user space processing components.

2. The system for service continuity in heterogeneous wireless networks of claim 1, further comprising an application programming interface (API) for interconnecting with said applications of said network device, and allowing said application to access the functions provided by said handover decision and session continuity user space processing components.

3. The system for service continuity in heterogeneous wireless networks of claim 2, wherein when said handover decision user space processing component, said session continuity user space processing component, or an application through said application programming interface asks said cross-layer cooperative user space processing component for at least one command service or at least one information service, said cross-layer cooperative user space processing component performs said command or acquires said information.

4. The system for service continuity in heterogeneous wireless networks of claim 2, wherein said handover decision user space processing component, said session continuity user space processing component or at least one of said applications through said application programming interface registers events service with said cross-layer cooperative user space processing component, and when at least one of the registered events occurs, said cross-layer cooperative user space processing component notifies said handover decision user space processing component, said session continuity user space processing component or said application of the occurrence of said events.

5. The system for service continuity in heterogeneous wireless networks of claim 3, wherein said application programming interface allows said applications to access functionalities provided by said handover decision user space processing component, said session continuity user space processing component, and said cross-layer cooperative user space processing component.

6. The system for service continuity in heterogeneous wireless networks of claim 4, wherein said application programming interface allows said applications to access functionalities provided by said handover decision user space processing component, said session continuity user space processing component, and said cross-layer cooperative user space processing component.

7. The system for service continuity in heterogeneous wireless networks of claim 2, wherein said API is a user space software component of said network device, and said cross-layer cooperative user space processing component connects through a netlink to kernel space software components executing at the transport layer, a network layer and a link layer.

8. A method for service continuity in heterogeneous wireless networks, comprising:
 utilizing a handover decision user space processing component to maintain link layer association and network layer reachability, including reselection of a new base station and acquisition of a new IP address from said new base station when a network condition cannot satisfy a plurality of applications;
 utilizing a session continuity user space processing component to maintain session continuity, including maintaining a plurality of transport layer connections and ensuring concurrent, in-order, and reliable transmission over said transport layer connections; and
 utilizing a distinct cross-layer cooperative user space processing component to interact with, and perform command and information services for, an application programming interface and said handover decision and session continuity user space processing components;
 wherein said cross-layer cooperative user space processing component executes to interact with a kernel space processing component executing at a transport layer responsive to said handover decision and session continuity user space processing components,
 wherein said session continuity user space processing component on a network device offers a session ID when said network device initializes a session with a corresponding device,
 when said network device acts as a sender, said session continuity user space processing component adds said session ID and said session sequence number to each outgoing data packet, and
 when said network device acts as a receiver, said session continuity user space processing component determines if said data packets with different IP addresses belong to a common session when said session continuity user space processing component receives said data packets via the previous base station and the new base station after handover, or via a plurality of transmission paths for concurrent multipath transmission, and
 said sequence number is used for transmission between said network device and said corresponding device.

* * * * *